(No Model.) 3 Sheets—Sheet 3.
W. TUNSTILL.
COOLING AND REFRIGERATING BUTTER, &c.
No. 259,783. Patented June 20, 1882.
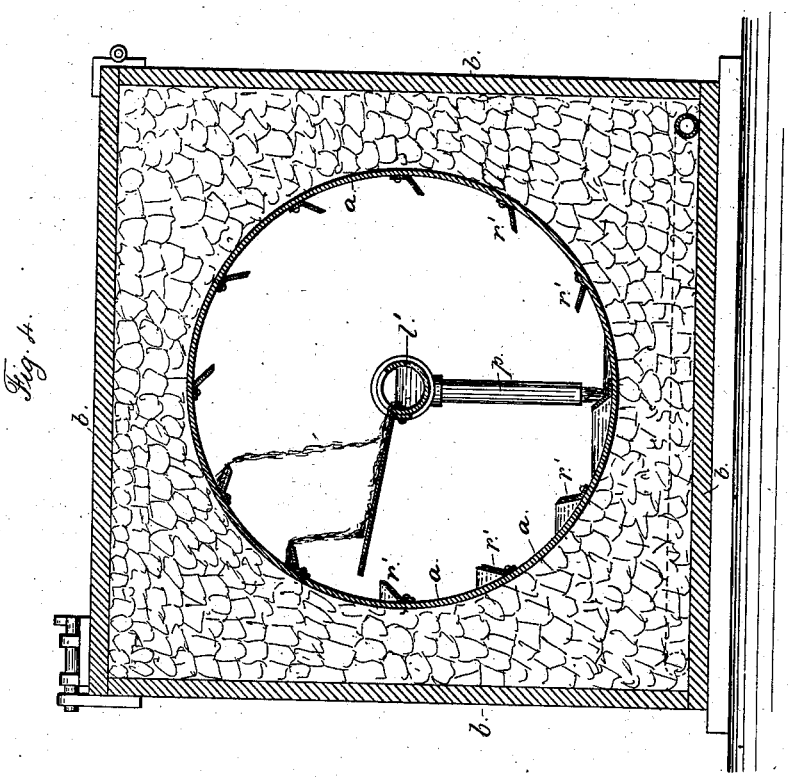
Witnesses
Chas H Smith
Harold Ferrell
Inventor
William Tunstill

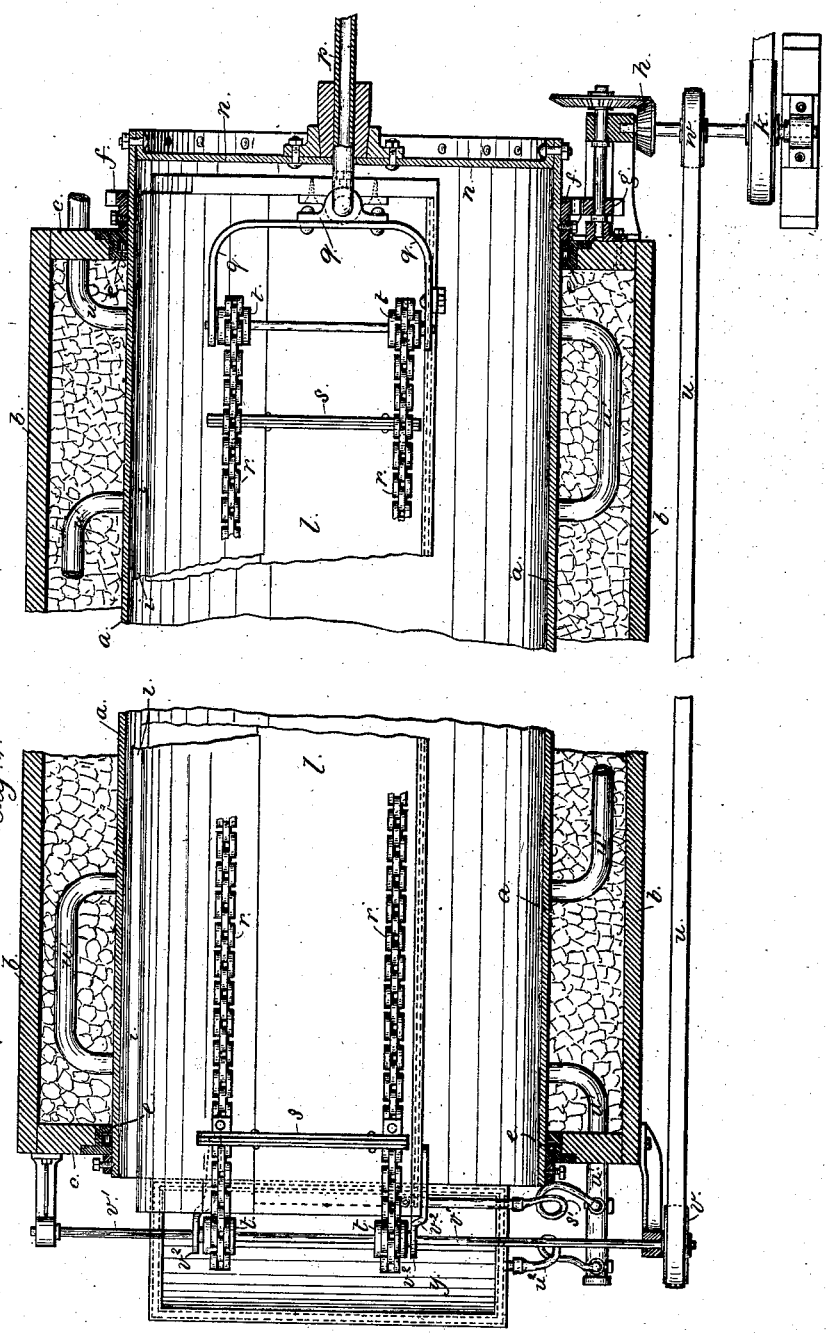

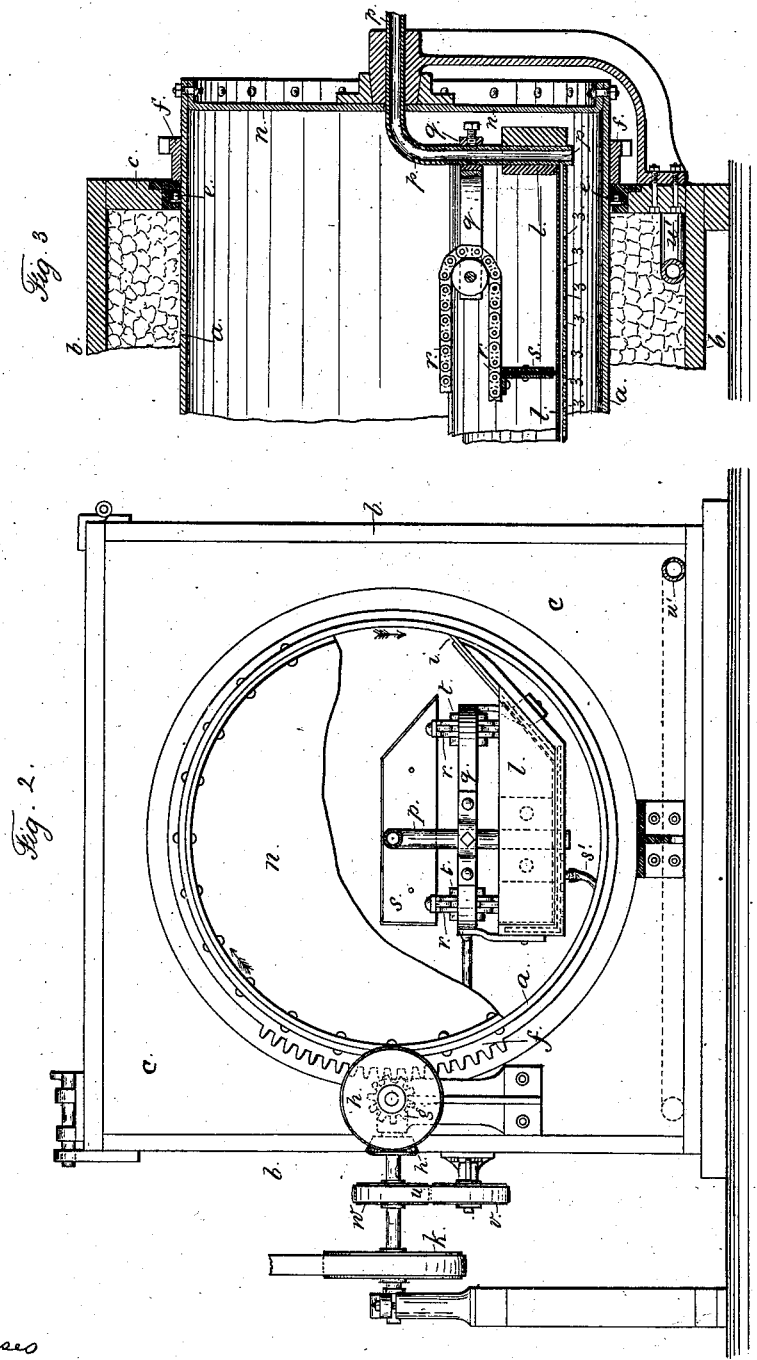

UNITED STATES PATENT OFFICE.

WILLIAM TUNSTILL, OF NEW YORK, N. Y.

COOLING AND REFRIGERATING BUTTER, &c.

SPECIFICATION forming part of Letters Patent No. 259,783, dated June 20, 1882.

Application filed November 4, 1881. (No model.)

*To all whom it may concern:*

Be it known that I, WILLIAM TUNSTILL, of the city and State of New York, have invented an Improvement in Cooling and Refrigerating Butter and other Articles, of which the following is a specification.

Ice-cream freezers have been made with a cylinder that receives the cream, and the same has been revolved. In some instances there has been a scraper to remove the portion which congeals upon the cylinder.

My invention is made especially for the cooling of oleomargarine; but it may be used for cooling or refrigerating any materials, especially such as become solid, or partially so, as they cool; or liquids may be cooled in this apparatus.

I provide a cylinder of metal, open at one or both ends and passing through a box containing ice. This cylinder is revolved, and the material to be cooled is supplied near one end and flows over the inside of the cooled cylinder, and the materials that congeal and adhere to the inside of such cylinder are scraped off and pass into a trough, from which they are drawn and delivered at the end of the trough by scrapers moved by endless belts or chains. By this improvement the cooling operation is progressive and uniform, there is no delay in cooling the whole of a large mass before any of it is ready for delivery from the machine, and the cooling operation is carried on with regularity in a manner corresponding to the production of the material to be cooled or to the demand for the same.

In the drawings, Figure 1 is a horizontal section of the machine. Fig. 2 is an end view with the cylinder-head partially removed. Fig. 3 is a vertical section at the supply end of the machine, and Fig. 4 is a cross-section of a modification of the apparatus adapted to cooling of water or other liquids.

The cylinder $a$ is preferably of sheet metal—such as copper—made true and smooth on the inside and carefully tinned. This cylinder passes through the ice-box $b$ $c$, the ends $c$ of which have circular openings for the cylinder, and bearings to support such cylinder and allow it to be revolved.

There may be anti-friction wheels upon the outside of the ice-box, beneath the cylinder, to sustain the weight of the same. There should also be hydraulic packings at $e$ to prevent the water from the ice or salt escaping between the cylinder and heads of the box. There is to be a movable cover to the ice-box to give access for introducing cracked ice and salt or similar materials.

At one end of the cylinder is a gear, $f$, around the outside, and a pinion, $g$, driven by suitable power for rotating the cylinder at the proper speed. I prefer and use bevel-gears $h$ to communicate power from the pulley $k$ to the pinion $g$.

Within the cylinder $a$ there is a trough, $l$, having a scraping-edge, $i$, preferably of a sheet of india-rubber, fastened within the inclined side of the trough and projecting beyond it, so that only the rubber comes into contact with the inner surface of the cylinder to scrape the material off the same as it is moving in the direction of the arrow against the scraper. This trough is to be suitably supported.

If the cylinder is open at both ends, the trough may be longer than the cylinder, so as to rest upon cross-bearers upon brackets or frames projecting from the ice-box. If the cylinder is closed at one end, or partially so, I introduce a central support through the head $n$. I have represented such support as also forming the supply-pipe $p$, there being a clamping-frame $q$ upon the trough, through which the pipe $p$ passes, so that the trough can be raised or lowered on the pipe and clamped in such a position that the scraper will bear properly upon the inner surface of the cylinder.

The oleomargarine in a melted condition, together with the milk and water with which it is agitated, or whatever material is to be cooled, is run into the cylinder $a$ through the pipe $p$, said pipe discharging the material below the trough $l$. The portions which cool or congeal adhere to the inside of the cylinder, and are carried up and scraped off by the scraper $i$. The portions that are not immediately congealed remain at the bottom and run along in the cylinder until all the material that will congeal or cool has been scraped off the interior of the cylinder $a$ and received into the trough.

If a liquid or semi-liquid material is being cooled, it may run along the trough and out of the delivery end; but it is necessary to remove butter or similar material from the trough $l$. For this purpose I use one or more scrapers, $s$, on endless chains or belts $r$, that pass around pulleys or rollers $t$. Motion is given to these by a pulley, $v$, and belt $u$ from the pulley $w$ on the driving-shaft. The butter or other material falls away from the scraper $s$ into a receptacle, $y$. The shaft $v'$ is supported in bearings from the box $b\ c$, and it also serves to support the trough at this end by means of hooks $v^2$, passing over and resting on the shaft.

I make the trough of sheet metal and hollow, as shown, and also make the receptacle or box $y$ with double walls, so that cold air may be passed into both the walls of the receptacle and the trough. This cold air is supplied from a pump or blower into the coil $w'$ in the bottom of the ice-box, and from thence it passes, by the flexible pipe $w^2$, into the air-space in the double walls of the box or receptacle $y$, and from $w'$ the air passes, also by the pipe $s'$, into the hollow trough to keep the same cool, and there are holes in the bottom part of the hollow trough, as at 3, from which the cold air passes into the cylinder $a$ to aid in cooling and ventilating the same.

When the cylinder $a$ is used to cool liquids it may have on its inner surface lifting-buckets $r'$, as shown in Fig. 4, to raise the liquid and pour it into the trough $l'$, and said trough may be in the form of a tube or receptacle for the water or other liquid, with a faucet at one end, so that the cooled liquid may be drawn off as required.

The cylinder $a$ may be revolved continuously by power, or periodically, as required.

I claim as my invention—

1. The combination, with the ice-box, of the cylinder $a$, passing through the ice-box, and packings or bearings for such cylinder at the openings in the ice-box, and means for supplying the liquid to be cooled within the cylinder, and a scraper for removing the cooled material from the inner surface of the cylinder, as set forth.

2. The trough $l$, having a scraper at one edge thereof, in combination with the revolving cylinder $a$, means for supporting the trough, an ice-box around the cylinder, and means for revolving the cylinder, substantially as set forth.

3. The combination, with the revolving cylinder and ice-box, of a trough and scraper supported within the cylinder, and an endless belt or chain and scrapers to remove the material from the trough, substantially as specified.

4. The combination, with the revolving cylinder and surrounding ice-box, of a trough for receiving the material that is cooled by contact with the surface of the cylinder, substantially as set forth.

5. The hollow trough, and means for supplying cold air into the same, in combination with the revolving cooling-cylinder and surrounding ice box, substantially as set forth.

6. The combination, with the ice-box, revolving cylinder, and hollow trough, of a coil of pipes in the ice-box, and connecting-pipe from such coil to the hollow trough, and air-escape openings in the bottom of the trough, substantially as set forth.

7. The combination, with the delivery-trough, of the ice-box, the revolving cylinder $a$, passing through such ice-box, and buckets $r'$ upon the inside of the said cylinder, substantially as set forth.

Signed by me this 31st day of October, A. D. 1881.

WILLIAM TUNSTILL.

Witnesses:
GEO. T. PINCKNEY,
WILLIAM G. MOTT.